Feb. 11, 1941.   M. E. LAKE ET AL   2,231,076
GAS FILTER
Filed Jan. 16, 1940
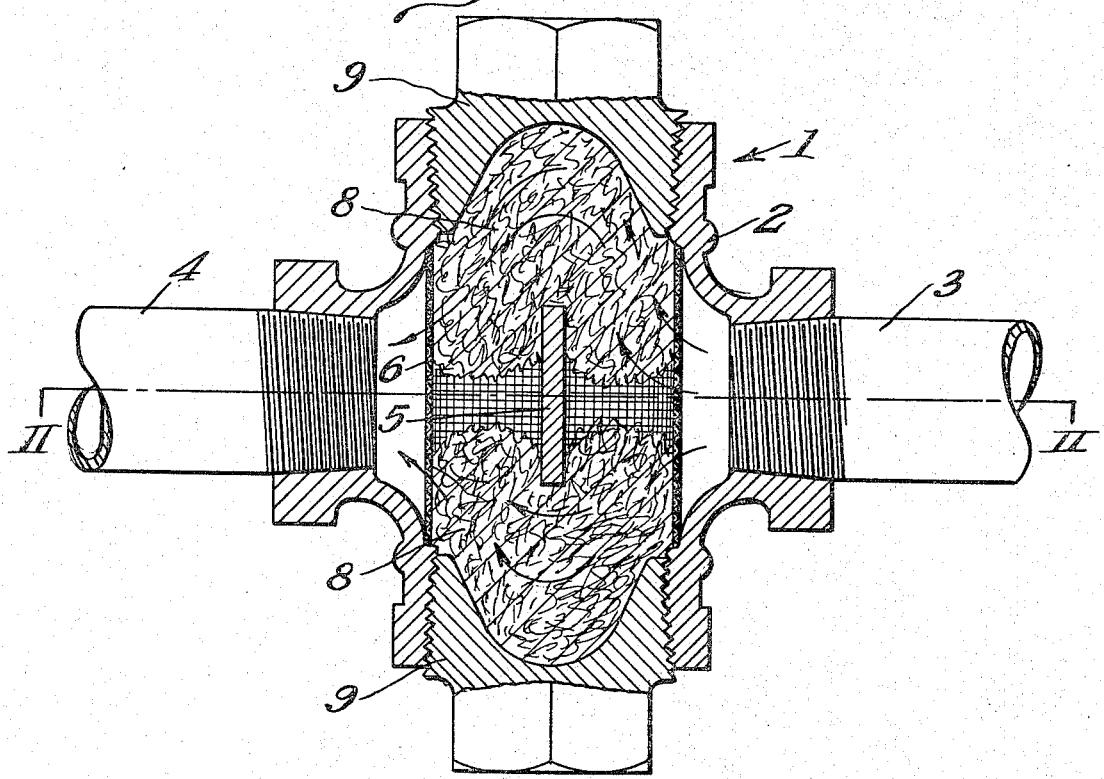
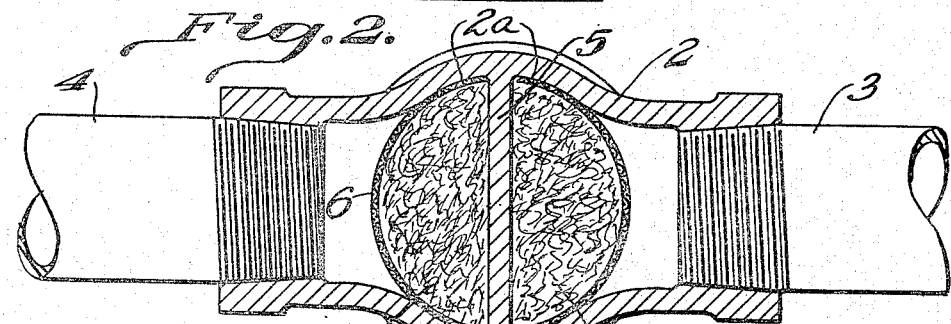
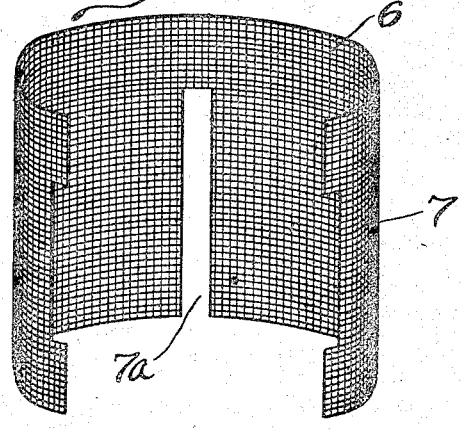
Inventors
Milton E. Lake
William L. Lyon
By
W. S. M. Howell
Attorney Patented Feb. 11, 1941

2,231,076

UNITED STATES PATENT OFFICE 2,231,076

GAS FILTER

Milton E. Lake and William Lewis Lyon, South Norwalk, Conn.

Application January 16, 1940, Serial No. 314,112

7 Claims. (Cl. 183—49)

This invention relates generally to gas service equipment and is particularly directed to an improved filter for removing solid foreign material from illuminating gas.

It is common knowledge that as gas flows through the pipe lines from the source to the various points of consumption, much foreign material, such as dust, rust, scale and oxide formation, is picked up and moved along therewith. This material, if not removed, tends to clog the small orifices in gas utilizing and control apparatus and seriously interferes with its operation. It has been found that where filters are not employed, the presence of the foreign material in the gas interferes with the flow of gas through the meters, control valve and pilot light orifices and frequently causes the extinguishment of pilot flames of automatically controlled gas utilizing apparatus. Such pilot flame failures, known in the industry as pilot outages, result in the creation of serious explosive hazards. Even when automatically controlled apparatus is not used, the inconvenience caused by the frequent stoppage of small orifices is very great and involves considerable service expense.

The primary object of the invention resides in the provision of a filter which will completely remove these suspended solids from gas flowing through service lines without materially reducing the rate of flow of the gas through the line.

A second object resides in providing a filter which can be permanently connected in a service line to filter the gas flowing therethrough, the filter being provided with one or more wads of fibrous filtering material which can be removed and replaced without disconnecting the filter from the line.

Another object rests in forming a filter with a casing conforming in size and shape to a well known pipe fitting, and providing the casing with partition means to make a plurality of passages, the combined area of the passages being greater than the cross-sectional area of the line in which the casing is connected, the passages also being provided with wads of filtering material to remove solid foreign matter from the gas as it flows therethrough.

A further object resides in providing the above mentioned casing with a hollow cylindrical body portion and positioning a foraminated metal cylinder in the body, the cylinder serving as a receiver for the fibrous filter material and holding the same in the body to prevent particles from passing through the line in response to forces exercised by the gas or other fluids flowing through the line.

Other objects will be apparent from the following description and the accompanying drawing in which the invention has been illustrated in one of its preferred forms. In the drawing:

Fig. 1 is a vertical longitudinal sectional view taken through a filter formed in accordance with the present invention;

Fig. 2 is a horizontal sectional view taken on the plane indicated by the line II—II of Fig. 1;

Fig. 3 is a perspective view of a section of foraminated filter medium supporting cylinder.

Referring more particularly to the drawing, the numeral 1 designates the improved filter in its entirety. This filter includes a body or casing portion 2 which, in this instance, is cross-shaped in configuration and resembles a standard pipe cross fitting. The casing is formed with two pairs of oppositely disposed openings, one pair constituting the inlet and outlet of the body. All openings are provided with threads, the inlet and outlet openings being adapted to receive pipe sections 3 and 4 forming part of a gas or other fluid line in which the filter is positioned.

Between the inlet and outlet, the body is provided with a transversely extending strip-like wall 5 which divides the interior of the body into a pair of passages, the total transverse area thereof being greater than the cross sectional area of the pipe sections 3 and 4. The wall 5 is disposed at right angles to the axis of the inlet and outlet openings and approximately half way between the other openings, it being of a height sufficient to extend slightly above and below the inlet and outlet ports whereby the direct flow of fluid from the inlet to the outlet will be prevented, the fluid being forced to flow through the passages formed by the wall and the inner surfaces of the body. The main portion of the body 2 is substantially cylindrical and receives a cylinder 6 formed from screen or other foraminated metal. This screen may be made of a section such as shown at 7 in Fig. 3 or it may be made in tube form and placed in the mold prior to casting the body so that it will constitute an integral part thereof.

When the screen is formed as disclosed at 7, the portions at the sides of the slot 7a may be rolled and the screen inserted in the body through one of the openings at the top or bottom of the body after it has been machined. As the screen section is being inserted, the slot 7a receives the web 5 and when the upper end of the slot engages the web, the rolled portions are released, permitting the screen to expand and engage the inner surfaces of the cylindrical portion of the body 2 at four places, as shown at 2a in Fig. 2, and be rigidly supported thereby. This engagement will prevent the fluid flowing through the body from passing around the filtering material or between it and the body walls. At this time, a plurality of wads of filtering material, disclosed at 8, are placed within the tubular screen. This material may be composed of treated or untreated curled horse hair, spun glass wool, wool wadding, fibrous felts and virgin lamb's wool, depending upon the characteristics of the gases to be filtered. After the material has been placed in the body, standard pipe plugs 9 are threaded into the openings at the top and bottom of the body to hold the material therein and prevent escape of gas.

As disclosed in Fig. 2, the filter containing screen engages the side portions of the body 2 and is held stationary to completely cover the passages formed by the wall 5 and the plugs 9. By this construction, all the gases passing through the filter are forced to flow through the filtering material and any foreign matter will be removed. After the filter has been in use for sometime, the wads of material will become soiled and may be removed by unthreading the plugs 9 and drawing the material 8 through the openings. This material may be cleaned or replaced as desired.

By providing the dividing wall 5, the velocity of the gas will be decreased as it passes through the filter and the solid materials will be more readily sifted out by the filtering material. Since the passages formed by the wall 5 are considerably greater in cross sectional area than the pipe line in which the filter is positioned, the gas will flow through the filter without substantial obstruction or decrease in pressure. Due to this provision, the amount of filtering material used is quite large and the periods when replacement will be required will be widely separated. By using the filter, the gases will be made cleaner and the gas utilizing apparatus will function for greater periods without inconvenience from stoppage caused by clogged orifices.

What is claimed is:

1. A gas filter comprising a hollow body having aligned inlet and outlet openings and a plurality of access openings, baffle means extending transversely of said body between said inlet and outlet, two edges of said baffle being spaced from the inner wall of said body to provide a pair of passages, the combined area of said passages being greater than the area of the inlet to said body, one of said access openings communicating with each passage, a quantity of gas pervious filter material disposed in each passage adjacent said access openings, screen means disposed in said body for holding said filter material in operative position, and means removably secured to said body and closing said access openings, said filter material being accessible from the exterior of said body upon removal of said closure means.

2. A gas filter comprising a cross-shaped hollow body having threaded openings at the ends of the arms of said cross, said body being adapted for connection in a pipe line and conforming in size to a similarly shaped standard pipe fitting, means dividing said body into a pair of passages having open communication with a pair of opposed openings, the total area of said passages being greater than the cross sectional area of the pipe line with which said body is adapted to be connected, standard pipe plugs disposed in certain of said threaded openings, and a quantity of fibrous filter material confined between said body dividing means and said plugs for penetration by the gas passing through said passages, said filter material being accessible from the exterior of said body upon removal of said plugs.

3. A gas filter comprising a hollow body having two sets of opposed openings, one set constituting the inlet and outlet of said body, a baffle wall extending transversely of and supported by said body between said inlet and outlet openings to prevent direct flow of fluid from one to another, said wall having edges spaced from the inner surfaces of said body and ports of said second set, a foraminated tubular member disposed in said body around said baffle, sections of said member extending across said inlet and outlet openings, plug means removably positioned in the openings of said second set, and a body of fibrous material disposed in each end of said foraminated member between said baffle and said plugs.

4. A gas filter comprising a cross-shaped hollow body having threaded openings at the ends of the arms of said cross, said body being adapted for connection in a pipe line and conforming in size to a similarly shaped standard pipe fitting, a web-like wall extending transversely of said body on the longitudinal axis of a pair of aligned arms, said wall being at right angles to the longitudinal axis of the second pair of arms and disposed in such relation thereto as to prevent direct flow therebetween, screen means between said wall and each of said second pair of arms, a wad of gas pervious filtering material between said wall and each of said first pair of arms, said screen means serving to prevent movement of said filtering material into the arms of said second pair, and means for closing the ends of the arms containing said filtering material.

5. A gas filter comprising a hollow body having two sets of opposed openings, one set being disposed at right angles to the other and constituting the inlet and outlet of said body, plug means removably positioned in the openings of the second set, a baffle strip having longitudinal side edges extending transversely of said body, said strip being connected at its ends with the side walls of the body and having the longitudinal edges spaced from the inner wall of the body and said plug means, and a quantity of fibrous filter material positioned in said body between the longitudinal edges of said strip and said plug means.

6. A gas filter comprising a hollow body having aligned inlet and outlet openings and a plurality of access openings, wall means extending transversely of said body and above and below the longitudinal axis of said inlet and outlet openings a slight distance to prevent direct flow therebetween and divide the interior of said body into a pair of passages communicating with the inlet and outlet openings and an access opening, a quantity of gas pervious filter material disposed in each passage adjacent to said access openings, and means removably secured to said body and closing said access openings, said filter material being accessible from the exterior of said body upon removal of said closure means.

7. A gas filter comprising a hollow body having registering inlet and outlet openings, a wall disposed at an angle to the longitudinal axis of said inlet and outlet openings and possessing a height substantially equal to the cross sectional dimension of said openings, said wall extending transversely of said body, the longitudinal axis of said wall being disposed in a plane containing the longitudinal axis of said inlet and outlet openings, said body being provided with access openings in spaced relation from the wall, fibrous filtering material positioned between the edges of said wall and the inner surfaces of said body adjacent thereto, filter material retaining means extending transversely of said body between said wall and said inlet and outlet openings, and cap means for closing the access openings in said body.

MILTON E. LAKE.
WILLIAM LEWIS LYON.